(12) United States Patent
Layt

(10) Patent No.: US 6,539,882 B2
(45) Date of Patent: Apr. 1, 2003

(54) METHODS FOR PLANTING PLANT BORDERS

(75) Inventor: Todd Anthony Layt, New South Wales (AU)

(73) Assignee: VersaScapes L.L.C., Mt. Pleasant, SC (US)

( * ) Notice: Subject to any disclaimer, the term of this patent is extended or adjusted under 35 U.S.C. 154(b) by 0 days.

(21) Appl. No.: 09/871,132

(22) Filed: May 31, 2001

(65) Prior Publication Data

US 2002/0062770 A1 May 30, 2002

(30) Foreign Application Priority Data

Nov. 28, 2000 (AU) .............................................. PR1702
Nov. 28, 2000 (AU) .......................................... 3927/2000

(51) Int. Cl.[7] .............................................. A01C 11/00
(52) U.S. Cl. ...................................................... 111/105
(58) Field of Search ............................... 47/33, 60, 85; 221/252; 111/100, 102, 103, 104, 105, 200, 900, 906, 183

(56) References Cited

U.S. PATENT DOCUMENTS

| 4,926,587 A | * | 5/1990 | van Wingerden | 47/85 |
| 4,934,093 A | * | 6/1990 | Yanna | 47/33 |
| 5,524,383 A | * | 6/1996 | Sanko et al. | 47/60 |

FOREIGN PATENT DOCUMENTS

| AU | B-65620/96 | 9/1996 | ............ A01G/9/10 |
| AU | 136024 | 12/1997 | |

* cited by examiner

*Primary Examiner*—Robert E. Pezzuto
(74) *Attorney, Agent, or Firm*—Myers Bigel Sibley & Sajovec

(57) ABSTRACT

A plant border assembly includes a plant tray defining a cavity and a top opening communicating with the cavity. The cavity has a width and a length that is greater than the width. The plant border assembly further includes a plant border including a growing medium disposed in the cavity and a strip of plants disposed in the growing medium in the cavity. The plant tray is adapted to allow removal of the plant border from the plant tray without lifting the plant border through the top opening.

25 Claims, 8 Drawing Sheets

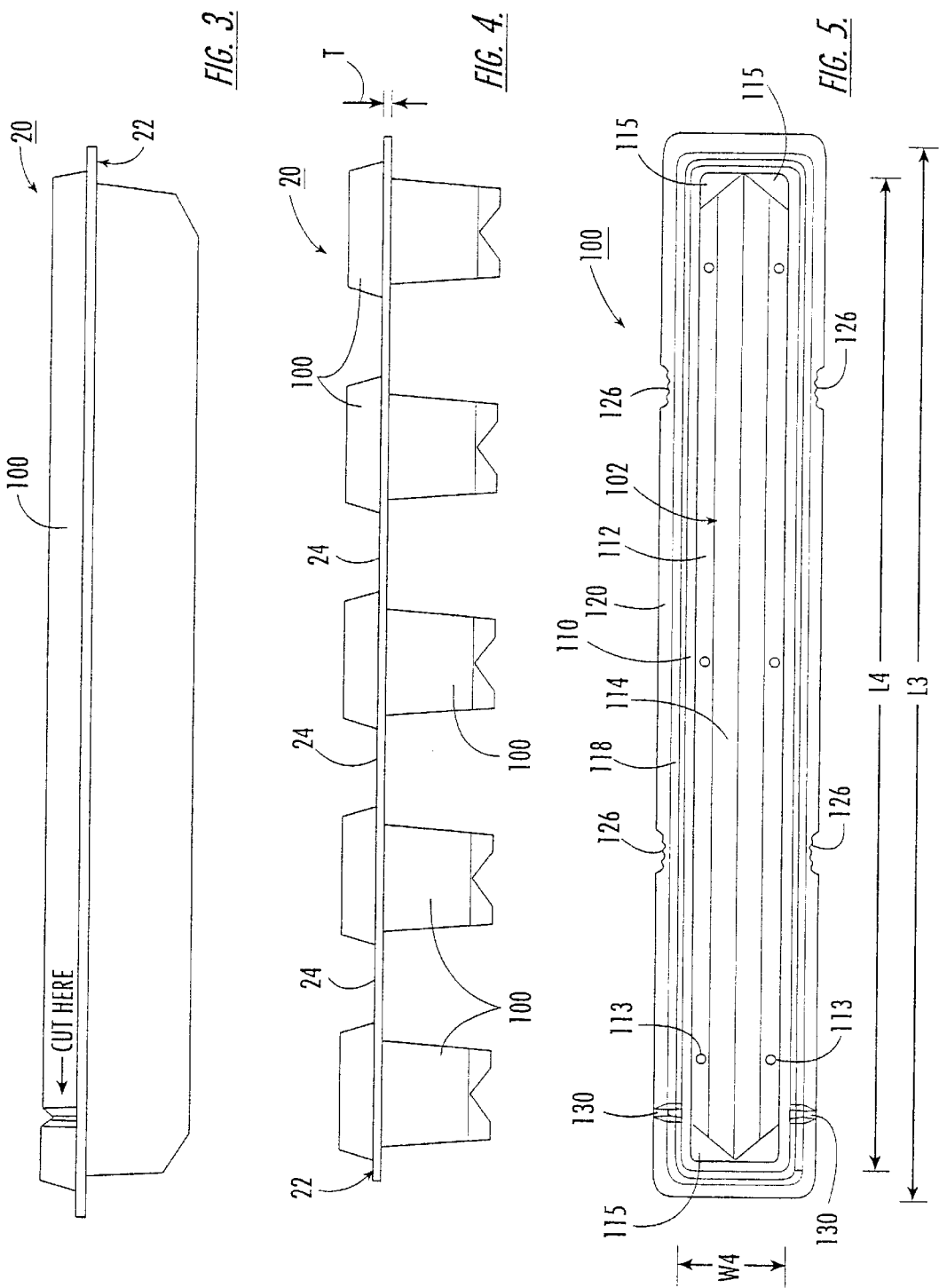

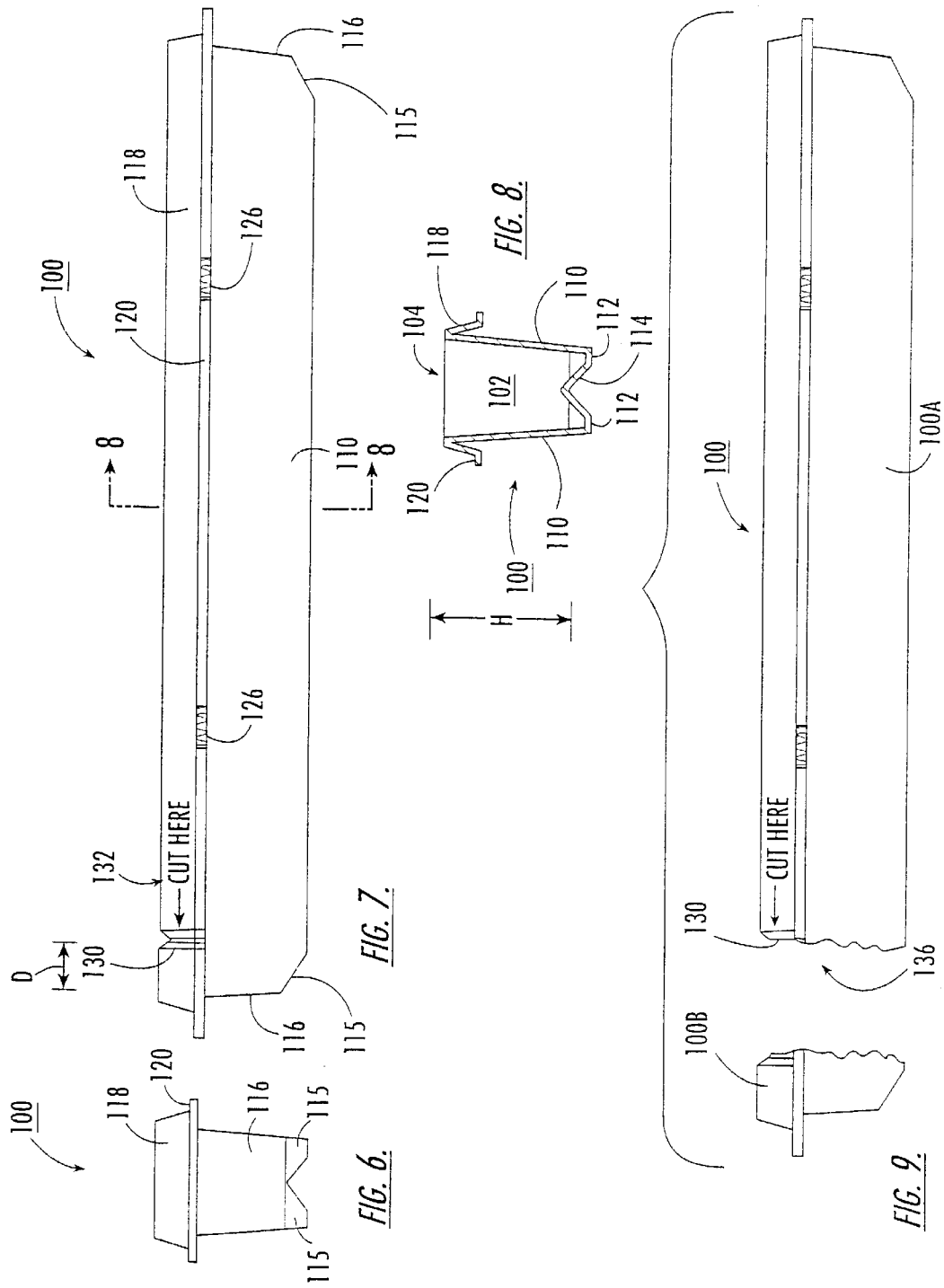

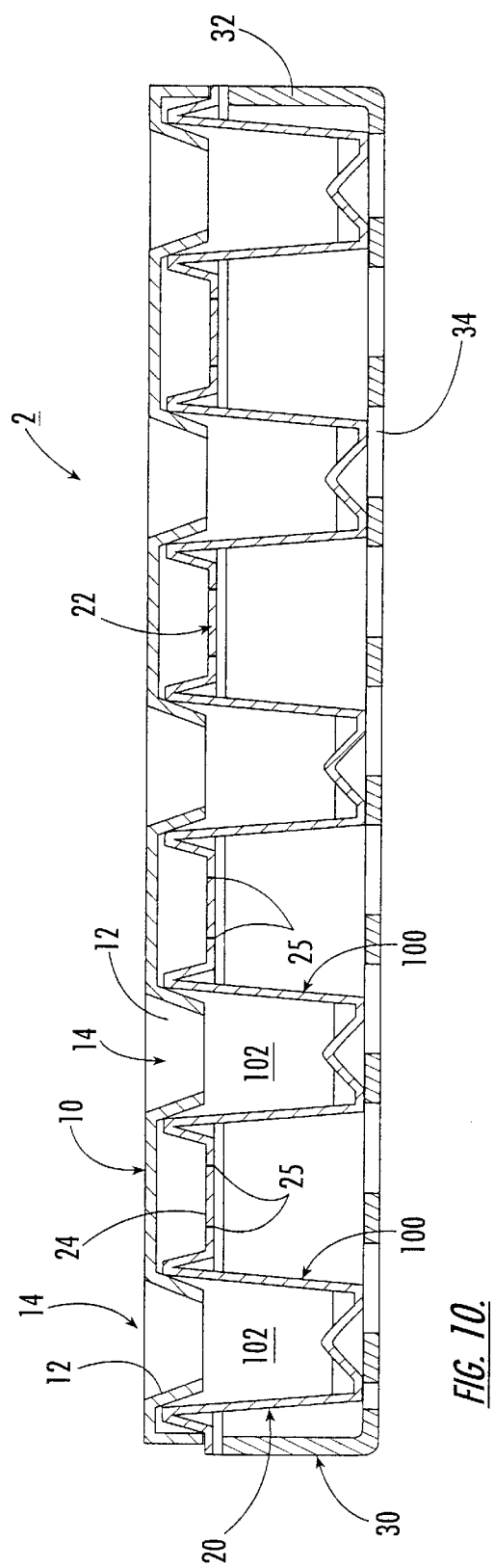
FIG. 10.
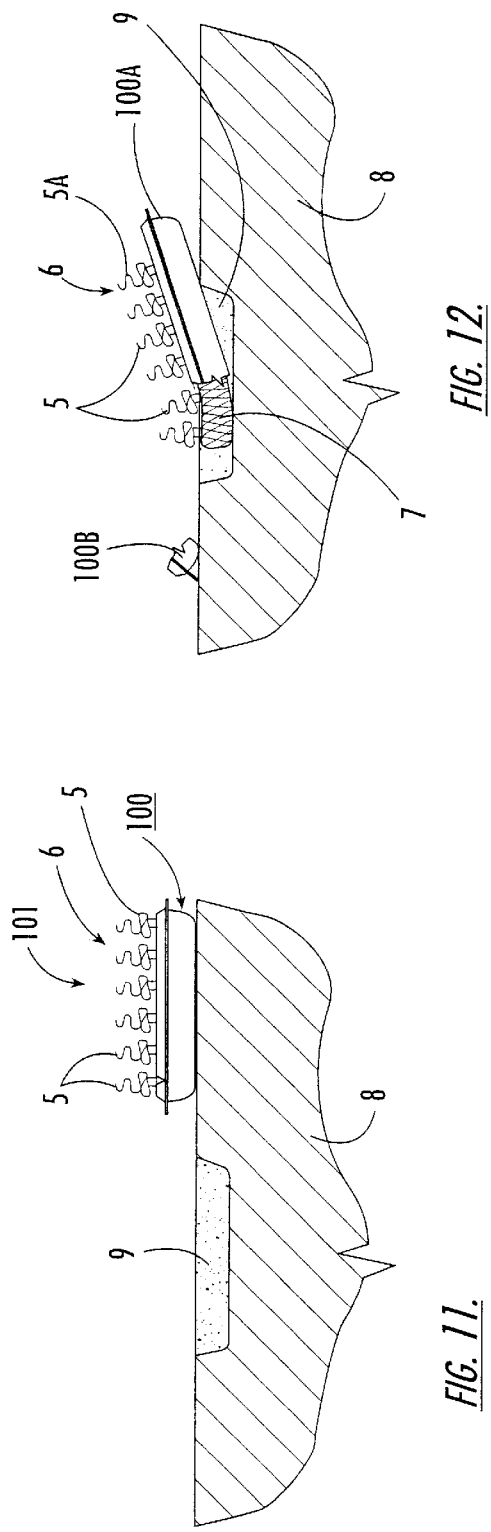
FIG. 12.
FIG. 11.

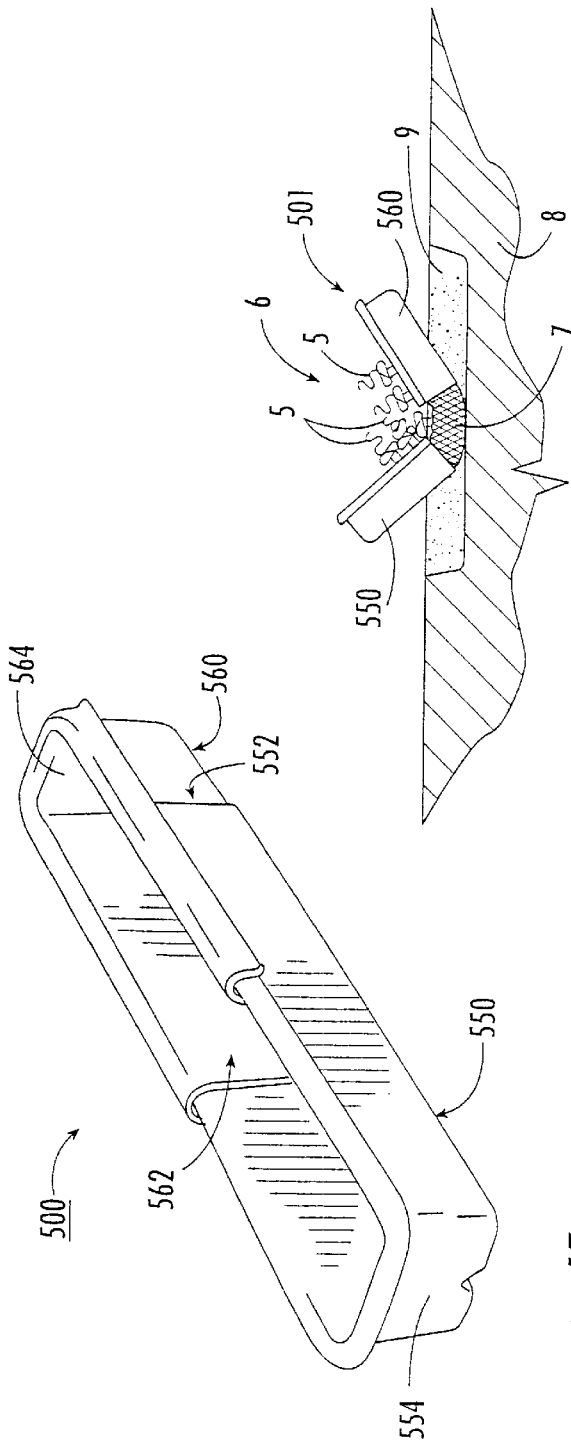
FIG. 17.
FIG. 18.
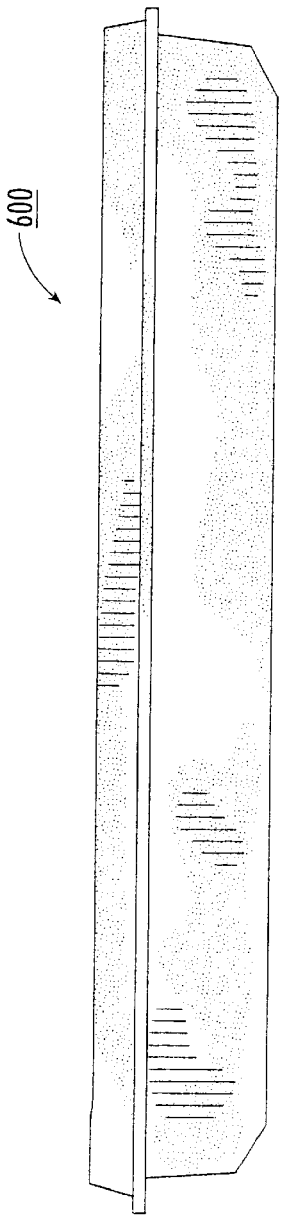
FIG. 19.

METHODS FOR PLANTING PLANT BORDERS

CROSS-REFERENCE TO RELATED APPLICATION

The present application claims priority to Australian Application No. 3927/2000 filed Nov. 28, 2000 and Australian Application No. PR1702 filed Nov. 28, 2000, the disclosures of which are hereby incorporated herein by reference in their entireties.

FIELD OF THE INVENTION

The present invention relates to plant trays and methods of planting and, more particularly, to plant trays for plant borders and methods for planting plant borders.

BACKGROUND OF THE INVENTION

It is often desirable to plant a substantially continuous or semi-continuous strip of plants to form a landscape edging commonly referred to as a plant border. Plant borders are often planted along driveways, sidewalks, garden beds, fence lines, paths, courtyards and the like. It is desirable to provide such strips of plants in a manner that allows for convenient handling and planting. It is further desirable to provide means for cost-effectively and conveniently growing and packaging plant borders.

SUMMARY OF THE INVENTION

According to embodiments of the present invention, a plant border assembly includes a plant tray defining a cavity and a top opening communicating with the cavity. The cavity has a width and a length that is greater than the width. The plant border assembly further includes a plant border including a growing medium disposed in the cavity and a strip of plants disposed in the growing medium in the cavity. The plant tray is adapted to allow removal of the plant border from the plant tray without lifting the plant border through the top opening. Preferably, the length is greater than the width.

According to embodiments of the present invention, a plant tray is provided for a plant border including a growing medium and a strip of plants. The plant tray defines a cavity adapted to receive the plant border and has an end portion. The end portion is adapted to be removed to form an end opening through which the plant border can be removed from the plant tray.

According to further embodiments of the present invention, a plant border assembly includes a plant tray defining a cavity and having an end portion. The plant border assembly further includes a plant border including a growing medium disposed in the cavity and a strip of plants disposed in the growing medium in the cavity. The end portion of the plant tray is adapted to be removed to form an end opening through which the plant border can be removed from the tray.

According to further embodiments of the present invention, a plant tray is provided for a plant border including a growing medium and a strip of plants. The plant tray defines a cavity and a top opening in communication with the cavity. The plant tray includes a first sub-tray having an end opening. The plant tray further includes a second sub-tray having an end opening and slidably mounted in the first sub-tray. The first and second sub-trays are relatively mounted in telescoping relation with the respective end openings thereof communicating with the cavity of the plant tray.

According to embodiments of the present invention, a plant border assembly includes a plant tray defining a cavity and a top opening in communication with the cavity. The plant tray includes a first sub-tray having an end opening and a second sub-tray having an end opening and slidably mounted in the first sub-tray. The first and second sub-trays are relatively mounted in telescoping relation with the respective end openings thereof communicating with the cavity of the plant tray. The plant border assembly further includes a plant border including a growing medium disposed in the cavity and a strip of plants disposed in the growing medium in the cavity.

According to further embodiments of the present invention, a plant tray is provided for a plant border including a growing medium and a strip of plants. The plant tray defines a cavity and a top opening communicating with the cavity. The cavity has a width and a length that is greater than the width. The plant tray is formed of a biodegradable material.

According to further embodiments of the present invention, a plant border assembly includes a plant tray defining a cavity and a top opening communicating with the cavity. The cavity has a width and a length that is greater than the width. The plant tray is formed of a biodegradable material. The plant border assembly further includes a plant border including a growing medium disposed in the cavity and a strip of plants disposed in the growing medium in the cavity.

According to further embodiments of the present invention, a tray assembly for plant borders includes first and second adjacent, spaced apart plant trays. Each of the first and second plant trays defines a cavity and a top opening communicating with the cavity, the cavity having a width and a length that is greater than the width. At least one connecting portion extends between and connects the first and second plant trays. The tray assembly is configured such that the first and second plant trays can be separated from the connecting portion.

According to further embodiments of the present invention, a plant border system includes a tray assembly including first and second adjacent plant trays. Each of the first and second plant trays defines a cavity and a top opening communicating with the cavity, the cavity having a width and a length that is greater than the width. A fill cover overlies the tray assembly. The fill cover includes first and second funnel portions extending through the top openings and into the cavities of the first and second plant trays, respectively.

According to method embodiments of the present invention, a method for planting a plant border including a growing medium and a strip of plants includes providing a plant border assembly. The plant border assembly includes a plant tray defining a cavity and a top opening communicating with the cavity, the cavity having a width and a length that is greater than the width. The plant border assembly further includes a plant border including the growing medium disposed in the cavity and a strip of plants disposed in the growing medium in the cavity. The plant border is slid out of the plant tray without lifting the plant border upwardly through the top opening.

According to further method embodiments of the present invention, a method for planting a plant border including a growing medium and a strip of plants includes providing a plant border assembly. The plant border assembly includes a plant tray defining a cavity and a top opening communicating with the cavity, the cavity having a width and a length that is greater than the width. The plant tray is formed of a biodegradable material. The plant border assembly further includes a plant border including the growing medium disposed in the cavity and a strip of plants disposed in the growing medium in the cavity. The plant border assembly is placed into a trench. The plant tray is planted in the trench along with the plant border.

Objects of the present invention will be appreciated by those of ordinary skill in the art from a reading of the figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a side elevational view of the tray assembly of FIG. 2;

FIG. 4 is an end elevational view of the tray assembly of FIG. 2;

FIG. 5 is a top plan view of a plant border tray forming a part of the tray assembly of FIG. 2;

FIG. 6 is an end view of the plant border tray of FIG. 5;

FIG. 7 is a side elevational view of the plant border tray of FIG. 5;

FIG. 8 is a cross-sectional view of the plant border tray of FIG. 5 taken along the line 8—8 of FIG. 7;

FIG. 9 is a side elevational view of the plant border tray of FIG. 5, wherein an end portion thereof is separated from the remainder of the plant border tray;

FIG. 10 is a cross-sectional view of the plant border system of FIG. 1 taken along a line corresponding to the line 10—10 of FIG. 2;

FIG. 11 is a schematic view of a plant border assembly including the plant border tray of FIG. 5 and a trench for receiving a plant border of the plant border assembly;

FIG. 12 is a schematic view of the plant border assembly and trench of FIG. 11, wherein the plant border is partially installed in the trench;

FIG. 17 is a perspective view of a plant border tray according to further embodiments of the present invention;

FIG. 18 is a schematic view of a plant border assembly including the plant border tray of FIG. 17 and a plant border forming a part of the plant border assembly and being partially installed in a trench; and FIG. 19 is a side elevational view of a plant border tray according to further embodiments of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, "plant border" means an amount of growing medium into which a strip of a plurality of plants is fully or partially embedded. The plants may extend upwardly from the growing medium with the roots of the plants embedded in the growing medium. As used herein, "growing medium" means a substance that serves to support and sustain the plants and which is suitable for planting in a desired permanent or semi-permanent location with the strip of plants. Preferred growing mediums include potting soil, pine bark, peat and sand. Other suitable growing mediums include coir, compost and perlite. Exemplary plants which may be grown and planted using the present invention include, for example, Mondo Grass Fescue, Agapanthas, Leriope, flowers and other suitable plant varieties.

Figure 1:
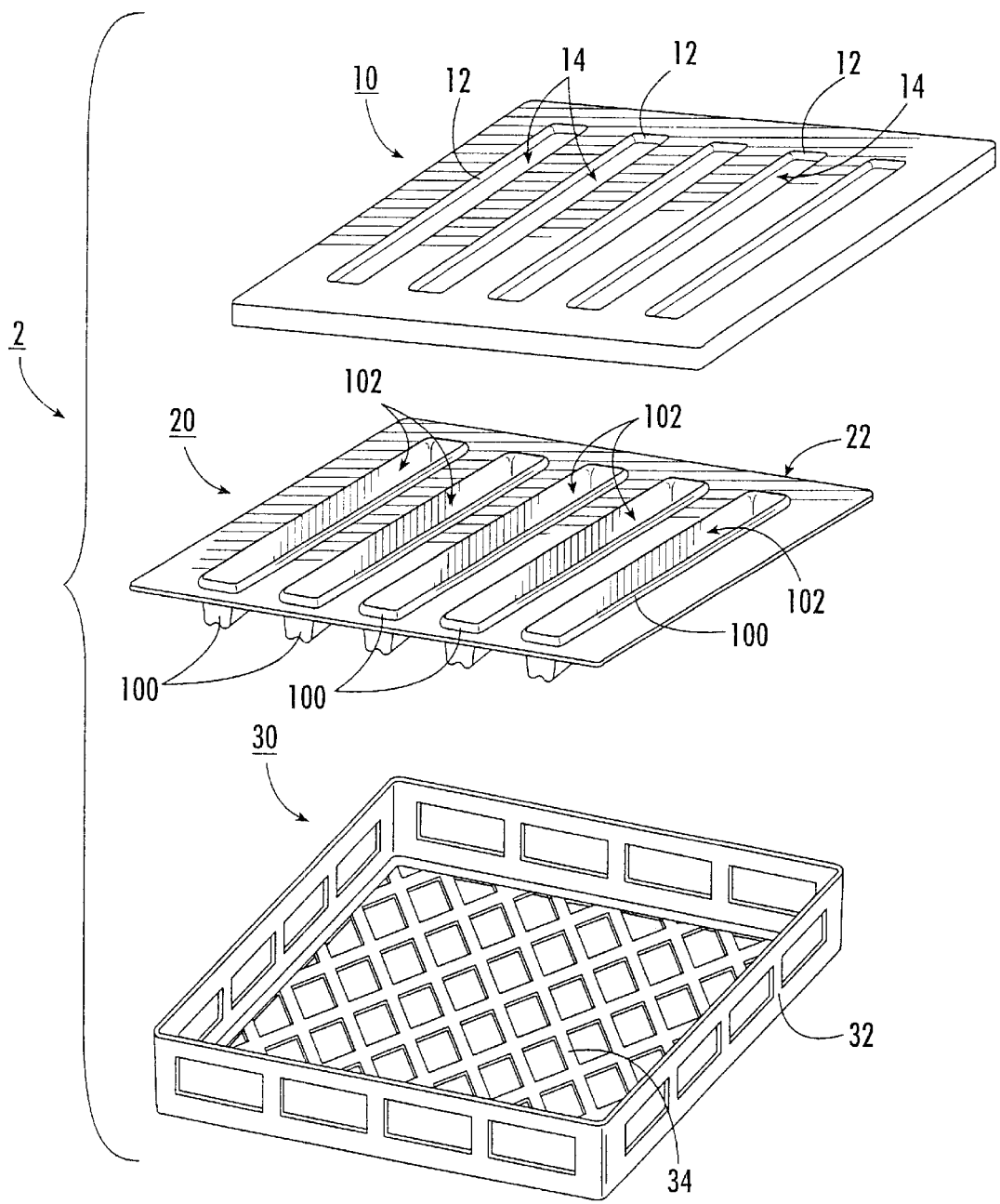
FIG. 1 is an exploded, perspective view of a plant border system according to the present invention.

With reference to FIGS. 1 and 10, a plant border system according to preferred embodiments of the present invention is shown therein and generally designated 2. The plant border system 2 includes a tray assembly 20, a fill cover 10 and a support container 30. As discussed in further detail below, the fill cover 10 may be used to facilitate installation of growing medium and plants into the tray assembly 20 and the support container 30 may serve to reinforce the tray assembly 20 during filling, growing, storing and handling.

With reference to FIGS. 1–4, the tray assembly 20 includes a plurality of (as shown, five) plant border trays 100 and an interconnecting web 22. As shown, the tray assembly 20 includes five trays 100; however, more or fewer trays 100 may be provided. The web 22 includes a plurality of connecting strips or portions 24 surrounding and interposed between the trays 100. The trays 100 are defined in part by cut lines 25. Preferably, the cut lines 25 extend fully through the thickness of the web 22. The cut lines 25 define a plurality of ties 26 which join the trays 100 and the connecting portions 24. The number of ties 26 may be more or fewer than those shown in the drawings. Preferably, the ties 26 each have a length of between about 3 and 30 mm. The ties 26 may be torn or cut using scissors, a knife or the like.

The tray assembly 20 is preferably formed of a continuous, molded, polymeric material. The tray assembly 20 may be formed by molding the tray in the configuration as shown and then die cutting the cut lines 25 into the tray assembly. Suitable polymeric materials for the tray assembly 20 include high impact polystyrene, ABS, PVC and polypropylene. The web 22 and the walls forming the trays 100 preferably have a substantially uniform thickness T (FIG. 4). Preferably, the thickness T is between about 0.6 and 2 mm.

Preferably, the tray assembly 20 has a length L1 (FIG. 2) of between about 350 and 670 mm. Preferably, the width W1 (FIG. 2) of the tray assembly 20 is between about 250 mm and 1.2 m. The connecting portions 24 between the trays 100 preferably each have a width W2 (FIG. 2) of between about 20 mm and 100 mm. The width W2 of the connecting portions 24 is preferably selected to provide a desired gap for growth of plants in the trays 100 such that the plants of adjacent trays 100 will not grow into each other during the intended period between planting or placement in the trays 100 and removal from the trays 100 (typically between about 45 and 600 days). By providing the desired distance between plants, the plants are provided with room to fill out. The tray assembly 20 provides efficiencies in handling and stability (especially tip-over prevention).

Each tray 100 may be removed from the tray assembly 20 by tearing the ties 26 which secure the tray 100 to the web 22. A tray 100 which has been removed in this manner is shown in FIGS. 5–9, 11 and 12. As best seen in FIGS. 5–8, the tray 100 includes a pair of opposed, tapered side walls 110 and a pair of opposed, tapered end walls 116. The bottom of the tray 100 is formed by a pair of flat bottom walls 112, an inverted V-shaped bottom wall 114, and tapered lower corner walls 115. The inverted V-shaped walls 114 assist in stabilizing and inhibiting flexure of the trays 100. A reinforcement collar 118 surrounds the upper portions of the side walls 110 and the end walls 116. A flange 120 surrounds the tray 100 and extends horizontally outwardly from the collar 118. The tray 100 defines a longitudinally extending cavity 102 and an upper, longitudinally extending opening 104 which communicates with the cavity 102.

Each tray 100 preferably has a width W3 (FIG. 2) of between about 40 and 78 mm. Each tray 100 preferably has a length L3 (FIG. 5) of between about 332 and 652 mm. Preferably, the length L4 (as measured from end wall 116 to end wall 116 at the top opening 104; FIG. 5) of the cavity 102 is greater than the width W4 (as measured from side wall 110 to side wall 110 at the top opening 104; FIG. 5) of the cavity 102. More preferably, the length L4 is at least six (6) times the width W4. Most preferably, the length L4 is between about six (6) and fourteen (14) times the width W4. Preferably, the length L4 is between about 330 and 650 mm and the width W4 is between about 38 and 76 mm. Preferably, the length L4 is at least six (6) times the height H of the cavity 102. The height H (FIG. 8) of the cavity 102 is preferably between about 38 and 98 mm. Preferably, the cavity 102 has a volume of between about 600 and 2300 cm$^3$.

Drain holes 113 are formed in the bottom walls 112. The regions on the flange 120 from which the ties 26 have been torn are indicated by the number 126. Cutting guide structures 130, preferably guide channels as shown, are molded into the collar 118 on either side. Preferably, the cutting guide structures 130 are positioned a distance D (FIG. 7) of between about 50 and 190 mm from the adjacent end wall 116. Additionally, indicia 132 is provided adjacent the cutting guide structures 130 to direct the user to cut the tray 100 at the designated location. The indicia 132 may be molded into or printed on the tray 100, or may be provided on a self-adhesive label or the like. In accordance with the indicia 132 and using the cutting guide structures 130, a user may cut the tray 100 to form a removed portion 100B and a remaining portion 100A as shown in FIG. 9.

Figure 2:
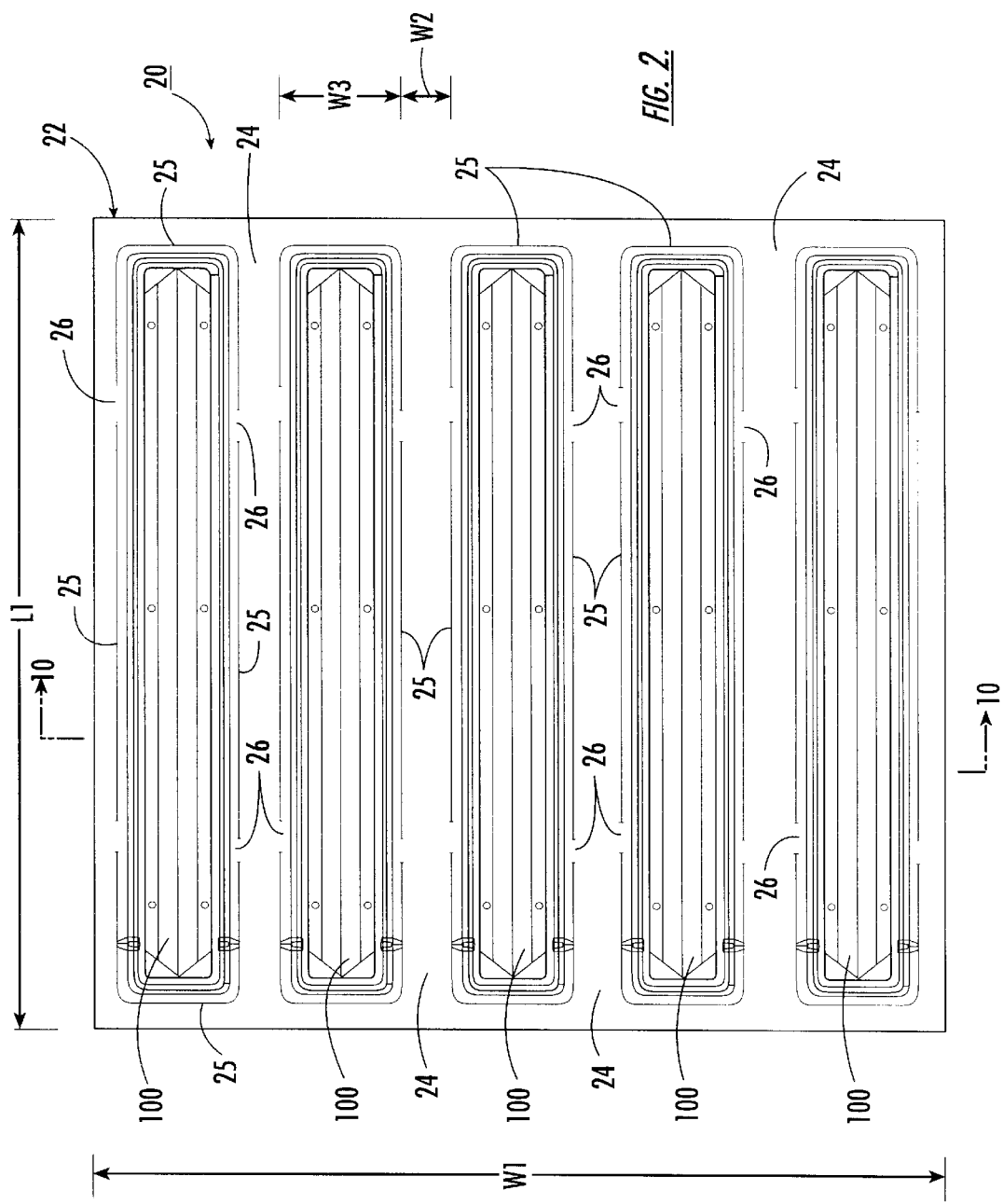
FIG. 2 is a top plan view of a tray assembly forming a part of the plant border system of FIG. 1.

The tray assembly 20 and each of the trays 100 may be used in the following manner. With reference to FIG. 1, the tray assembly 20 may be mounted in the support container 30 and the fill cover 10 may be placed over the tray assembly 20. The support container 30 includes surrounding, upstanding side walls 32 and a mesh or grated bottom wall 34. The bottom wall 34 allows for drainage. FIG. 10 is a cross-sectional view of the assembled system 2 of FIG. 1 taken along a line corresponding to the line 10—10 of FIG. 2 (FIG. 2 is a top plan view of the tray assembly 20 only). As shown in FIG. 10, the fill cover 10 is configured such that funnel portions 12 thereof extend into the cavities 102 of the respective trays 100. The operator may fill the cavities 102 with growing medium (e.g., soil) and plants or seeds through the respective openings 14 in the funnel portions 12. Additionally, water, fertilizer and other desired treatments and nutrients may be provided to the plants in the trays 100 through the openings 14. In this manner, the fill cover 10 serves to direct the various fill materials into the trays 100 and to prevent or minimize the runoff or the collection of these substances on the web 22. The plants are preferably grown in the trays 100.

For filling, growing, storage and handling, the tray assembly 20 may be retained in the support container 30. When it is desired to distribute a plant border 6 to plant the plant border 6, a tray 100 including the plant border 6 may be removed from the tray assembly 20 by tearing along the ties 26 (see FIG. 2). The selected tray 100 and the plant border 6 together form a plant border assembly 101 as shown in FIG. 11. The plant border 6 includes a growing medium 7 (e.g., soil; see FIG. 12) disposed in the cavity 102 and a plurality of plants 5 which have roots embedded in the growing medium 7 and which extend upwardly through the opening 104 of the tray 100.

The plant border 6 may be planted in a desired location in the ground 8 by digging or otherwise forming a trench 9 as shown in FIG. 11. The tray 100 is cut as shown in FIG. 9 along the cut guide structures 130 and the portions of the tray walls 110, 112, 114 extending between the cut guide structures 130. The tray 100 may be cut using, for example, scissors, a knife or the like. The end portion 100B formed by the cut is removed or folded away from the remaining portion 100A to form an end opening 136 (FIG. 9). The plant border 6 is then slid out of the remaining tray portion 100A through the opening 136 and into the trench 9 as shown in FIG. 12. In this manner, the plant border 6 may be removed from the tray 100 and installed in the trench with reduced or minimal disruption to the plant border 6.

Figure 13:
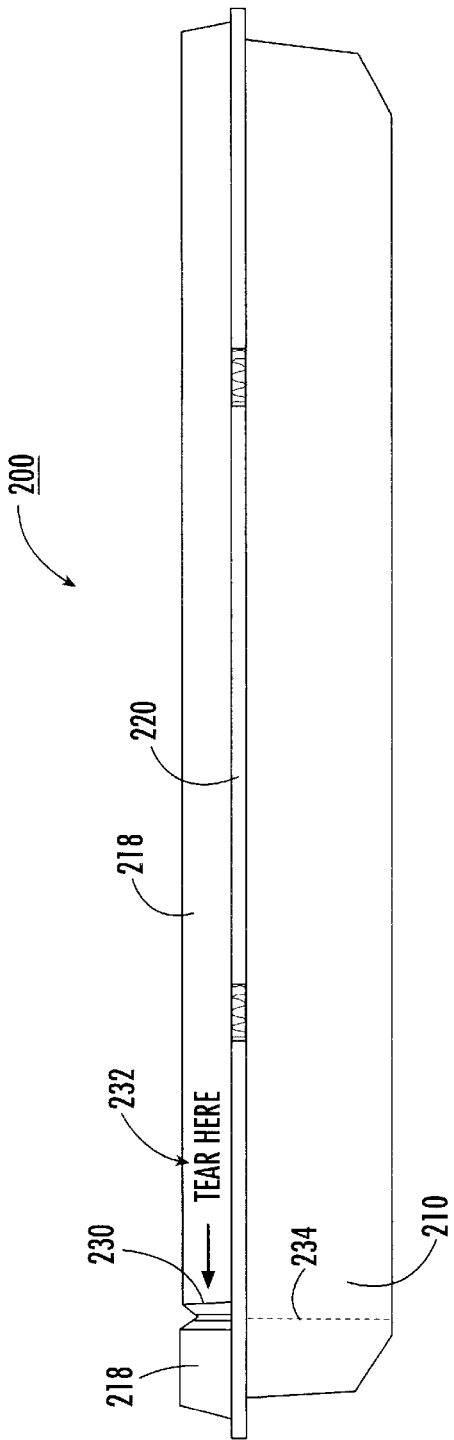
FIG. 13 is a side elevational view of a plant border tray according to further embodiments of the present invention.
Figure 14:
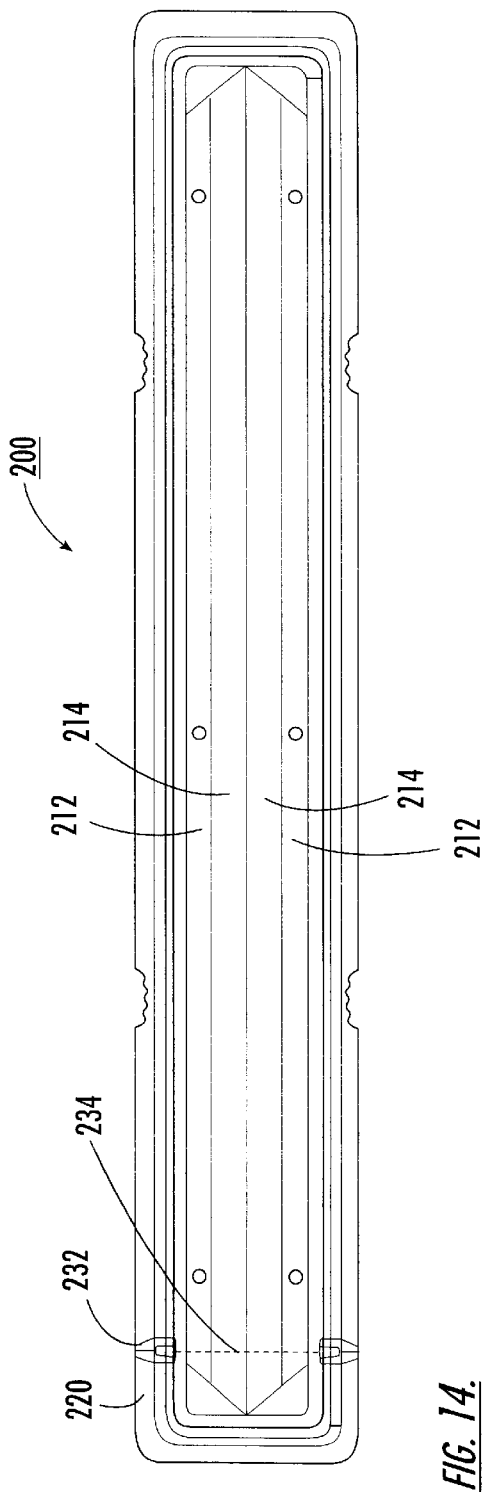
FIG. 14 is a top plan view of the plant border tray of FIG. 13.

With reference to FIGS. 13 and 14, a plant border tray 200 according to further embodiments of the present invention is shown therein. The tray 200 corresponds to the tray 100 except as follows. The tray 200 is further provided with a line of perforations 234. The perforations 234 preferably extend in a general U-shape substantially continuously from side edge to side edge, including through the flange 220, the collar 218, the side walls 210 and the bottom walls 212, 214. Complementary indicia 232 may instruct the user to tear along the perforations 234. In this manner, the tray 200 may be used in the same manner as the tray 100, except that, in place of cutting the end portion from the tray, the user merely tears the end portion away along the perforations 234. Alternatively, or additionally, a weakened line may be formed by means other than perforations. For example, the weakened line may be formed by scoring.

Figure 15:
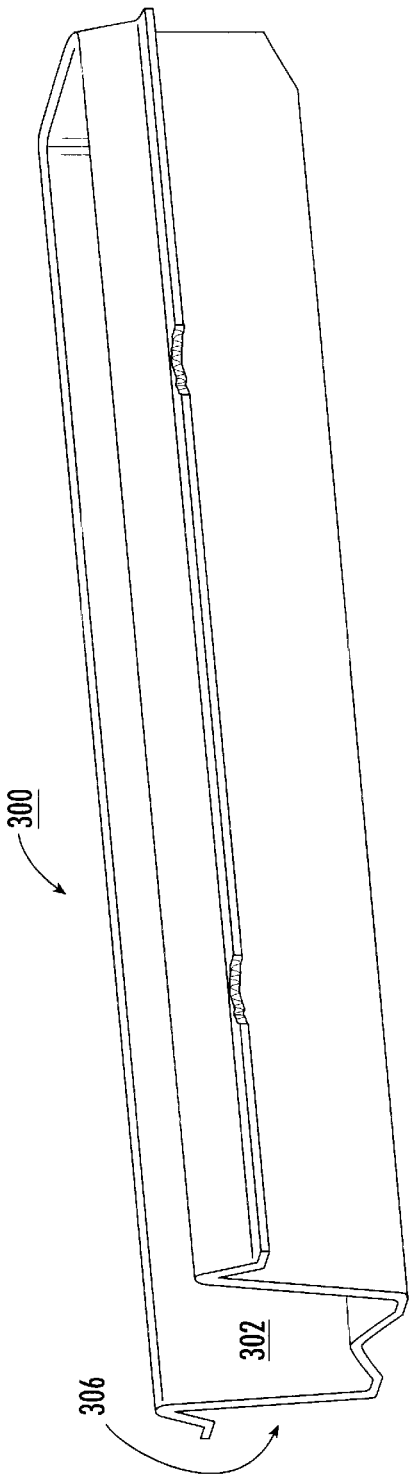
FIG. 15 is a perspective view of a plant border tray according to further embodiments of the present invention.

With reference to FIG. 15, a tray 300 according to further embodiments of the present invention is shown therein. The tray 300 corresponds to the tray 100 except as follows. The tray 300 is formed with an end opening 306 in place of one of the end walls 116. The opening 306 communicates with the cavity 302. The tray 300 may be used to plant a plant border in the same manner as described above with regard to the tray 100 (with the plant border being slid out of the tray 300 through the opening 306) except that it is not necessary to remove an end of the tray 300. The plant border, and particularly the growing medium, may be retained in the tray 300 by the side walls 32 of the support container 30 and/or by the inherent coherence of the growing medium.

Figure 16:
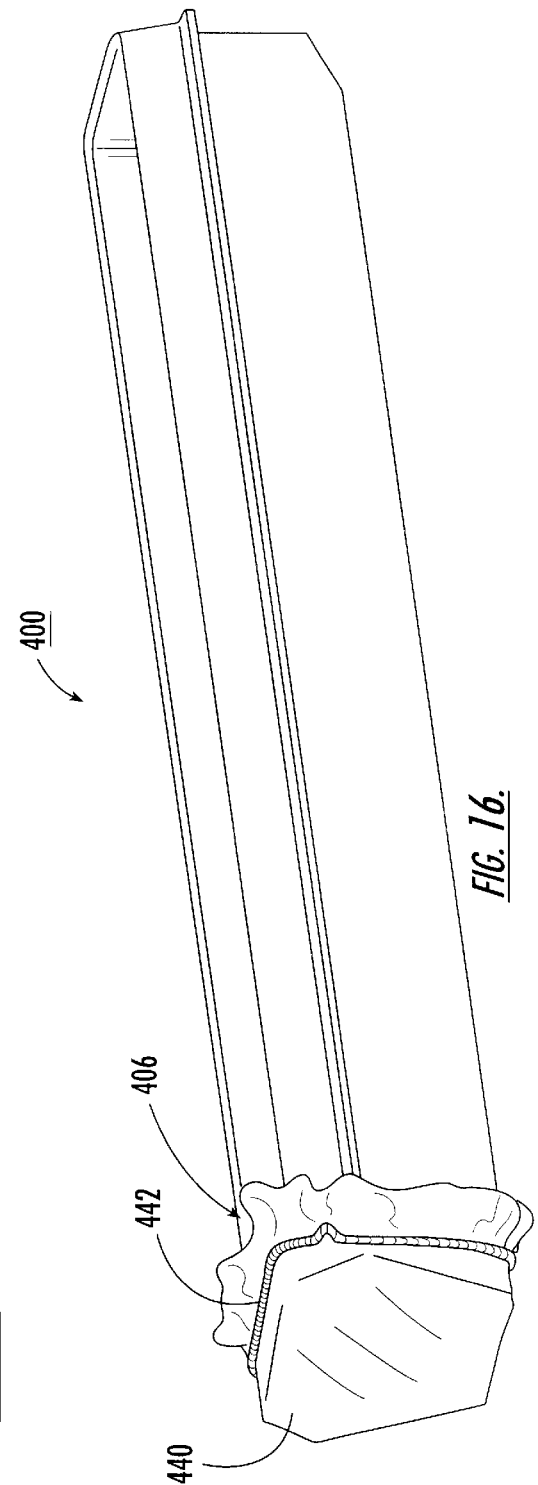
FIG. 16 is a perspective view of a plant border tray according to further embodiments of the present invention.

With reference to FIG. 16, a tray 400 according to further embodiments of the present invention is shown therein. The tray 400 corresponds to the tray 300 except as follows. The tray 400 has an end opening 406 corresponding to the end opening 306. The end opening 406 is covered with a cover member 440. The cover member 440 is preferably a flexible plastic film (preferably having a thickness of between about 15 and 150 μm). Alternatively, the cover member 440 may be formed of a fabric, wire mesh or other suitable material. The cover member 440 may be biodegradable. The cover member 440 may be retained on the end of the tray 400 by a rubber band or other elastic retaining device 442. Alternatively, the cover member 440 may be retained by a rope, heat fusing, adhesive, a clamp, fasteners or the like. The tray 400 may be used in the same manner as described above with regard to the tray 100, except that the cover member 440 is removed in place of cutting an end portion from the tray.

With reference to FIGS. 17 and 18, a plant border tray 500 according to further embodiments of the present invention is shown therein. As best seen in FIG. 17, the tray 500 includes a first sub-tray 550 and a second sub-tray 560. The sub-tray 550 has an end opening 552 and an opposing end wall 554. Similarly, the sub-tray 560 has an end opening 562 and an end wall 564. The sub-trays 550 and 560 are arranged in nested and telescoping relation with the respective end openings 552, 562 facing inwardly.

A plant border 6 maybe installed in the tray 500 with the tray in a joined or compressed position as shown in FIG. 17 to form a plant border assembly 501. When it is desired to plant the plant border 6, the user may place the plant border assembly 501 in or adjacent a trench 9 and pull the sub-trays 550,and 560 apart as shown in FIG. 18. In this manner, the plant border 6 is allowed to drop between and slide out of the sub-trays 550, 560 and into the trench 9.

With reference to FIG. 19, a plant border tray 600 according to further embodiments of the present invention is shown therein. The tray 600 corresponds to the tray 100 except as follows. Rather than or in addition to providing means for removing an end of the tray 600, the tray 600 is formed of a biodegradable material. Suitable biodegradable materials include cardboard, jute and coir. Preferably, the tray 600 is formed of egg carton material. A growing medium and a plurality of plants may be installed in the tray 600 as described above to form a plant border assembly (not shown). The plant border assembly may be placed in a trench in its entirety rather than removing the plant border from the tray 600. The tray 600 may be planted (e.g., covered over with soil) along with the plants so that the tray 600 remains in the ground indefinitely. Over time, the tray 600 will degrade or disintegrate into the ground.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for planting a plant border including a growing medium and a strip of plants, said method comprising:
   a) providing a plant border assembly including:
      a plant tray defining a cavity and a top opening communicating with the cavity, the cavity having a width and a length that is greater than the width; and
      a plant border including said growing medium disposed in the cavity and a strip of plants disposed in the growing medium in the cavity; and
   b) sliding the plant border out of the plant tray without lifting the plant border upwardly through the top opening.

2. The method of claim 1 including the steps of forming a trench and sliding the plant border into the trench.

3. The method of claim 1 including the step of removing an end portion of the plant tray to form an end opening, wherein said step of sliding the plant border out of the plant tray includes sliding the plant border through the end opening.

4. The method of claim 3 wherein said step of removing an end portion of the plant tray includes cutting the end portion from a remaining portion of the plant tray.

5. The method of claim 3 wherein said step of removing an end portion of the plant tray includes tearing along a weakened line of the plant tray to separate the end portion from a remaining portion of the plant tray.

6. The method of claim 1 wherein:
   the plant tray includes an end opening communicating with the cavity; and
   said step of sliding the plant border out of the plant tray includes sliding the plant border through the end opening.

7. The method of claim 1 wherein:
   the plant tray includes an end opening communicating with the cavity and a cover member removably covering the end opening; and
   said method includes removing the cover member from the plant tray and sliding the plant border through the end opening.

8. The method of claim 1 wherein:
   the plant tray includes first and second sub-trays each having an end opening;
   the first and second sub-trays are mounted in telescoping relation with the respective end openings thereof communicating with the cavity of the plant tray; and
   said step of sliding the plant border out of the plant tray includes pulling the first and second sub-trays apart.

9. The method of claim 1 wherein the length is at least six times the width.

10. The method of claim 1 wherein the length of the cavity is between about six and fourteen times the width.

11. The method of claim 1 wherein the length of the cavity is between about 330 and 650 mm and the width of the cavity is between about 38 and 76 mm.

12. The method of claim 1 wherein the plant tray is formed of a polymeric material.

13. The method of claim 12 wherein the polymeric material is selected from the group consisting of high impact polystyrene, ABS, PVC and polypropylene.

14. The method of claim 1 wherein the plant tray includes an inverted V-shaped, longitudinally extending bottom wall portion.

15. The method of claim 1 wherein the plant tray includes tapered lower end corner walls.

16. The method of claim 1 wherein the plant tray includes a reinforcement collar surrounding the top opening.

17. The method of claim 4 wherein the plant tray includes indicia thereon directing a user to cut the end portion from the remaining portion of the plant tray.

18. The method of claim 4 wherein the plant tray includes a cut guide structure disposed adjacent the end portion of the plant tray to facilitate cutting the end portion from the remaining portion of the plant tray.

19. The method of claim 18 wherein the plant tray includes indicia thereon directing a user to cut the plant tray along the cut guide structure.

20. The method of claim 5 wherein the weakened line includes a line of perforations.

21. The method of claim 20 wherein the plant tray includes indicia thereon directing a user to tear the plant tray along the weakened line.

22. The method of claim 7 including removing a retainer securing the cover member to the plant tray from the plant tray.

23. The method of claim 1 including:
   a) providing a tray assembly comprising:
      a second plant tray adjacent and spaced apart from the first plant tray; and
      at least one connecting portion extending between and connecting the first and second plant trays; and
   b) separating the first plant tray from the connecting portion.

24. The method of claim 23 wherein the step of separating the first plant tray from the connecting portion includes severing at least one integral tie connecting the connecting portion with the first plant tray.

25. A method for planting a plant border including a growing medium and a strip of plants, said method comprising:
   a) providing a plant border assembly including:
      a plant tray defining a cavity and a top opening communicating with the cavity, the cavity having a width and a length that is greater than the width, wherein the plant tray is formed of a biodegradable material; and
      a plant border including the growing medium disposed in the cavity and a strip of plants disposed in the growing medium in the cavity;
   b) placing the plant border assembly into a trench; and
   c) planting the plant tray along with the plant border in the trench.

* * * * *